United States Patent [19]

Millen, Jr. et al.

[11] Patent Number: 5,509,616

[45] Date of Patent: Apr. 23, 1996

[54] RETRACTABLE CHALK LINE DEVICE

[76] Inventors: Leopoldo E. Millen, Jr., 3469 McNab Ave., Long Beach, Calif. 90808; Joseph H. Weaver, 2319 Willow La., West Covina, Calif. 91790

[21] Appl. No.: 247,570

[22] Filed: May 23, 1994

[51] Int. Cl.[6] .............................. B44D 3/38; B65H 75/48
[52] U.S. Cl. .................................. 242/381.5; 242/385.4; 33/414; 33/756
[58] Field of Search ................................. 242/381, 381.1, 242/381.5, 381.6, 385, 385.4; 33/414, 756, 767

[56] References Cited

U.S. PATENT DOCUMENTS

| 55,327 | 6/1866 | McManus . | |
|---|---|---|---|
| 70,022 | 10/1869 | Richel . | |
| 88,212 | 3/1869 | Richardson . | |
| 352,502 | 11/1886 | Young . | |
| 627,057 | 6/1899 | Gavin . | |
| 648,044 | 4/1900 | Miller . | |
| 845,401 | 2/1907 | Field . | |
| 1,168,851 | 1/1916 | Carter . | |
| 1,208,008 | 12/1916 | Richardson . | |
| 1,272,270 | 7/1918 | Jarvio . | |
| 1,510,329 | 9/1924 | Nash . | |
| 1,831,666 | 11/1931 | Jacobia . | |
| 1,838,383 | 12/1931 | Fridolph . | |
| 1,876,473 | 9/1932 | Spaeth et al. | 33/414 |
| 2,469,674 | 5/1949 | Witchger | 242/381.1 |
| 2,561,707 | 7/1951 | Miller . | |
| 2,589,500 | 3/1952 | Landon et al. . | |
| 2,655,728 | 10/1953 | Cook . | |
| 3,191,308 | 6/1965 | Lindenau . | |
| 3,318,550 | 5/1967 | Quenot | 242/381.5 |
| 3,475,822 | 11/1969 | De Lain . | |
| 3,494,569 | 2/1970 | Quenot . | |
| 3,691,639 | 9/1972 | Roeseler et al. | 33/87 |
| 3,888,010 | 6/1975 | Hyde et al. | 33/87 |
| 3,889,897 | 6/1975 | Van Zelderen | 242/381.5 |
| 4,143,462 | 3/1979 | Gertz | 33/414 |
| 4,189,107 | 2/1980 | Quenot et al. . | |
| 4,192,078 | 3/1980 | Lore et al. | 33/414 |
| 4,197,656 | 4/1980 | Lane et al. | 33/414 |
| 4,565,011 | 1/1986 | Karger | 242/381.6 |
| 4,592,148 | 6/1986 | Longenette | 33/414 |
| 4,765,557 | 8/1988 | Kahmann . | |
| 4,813,145 | 3/1989 | Josey, Jr. et al. | 33/414 |
| 4,907,348 | 3/1990 | Hubbard, Jr. | 242/385.4 |
| 5,042,159 | 8/1991 | Millen | 33/414 |
| 5,400,521 | 3/1995 | Waldherr | 33/767 |

FOREIGN PATENT DOCUMENTS

| 352126 | 3/1905 | France . |
|---|---|---|
| 140646 | 4/1903 | Germany . |

Primary Examiner—John P. Darling

[57] ABSTRACT

An automatically retracting chalk line dispenser including, in part, a casing forming a reservoir for storing a quantity of chalk dust. A spool assembly includes a spool having string disposed within the casing such the string contacts the chalk dust. An automatic, centrifugal speed regulator assembly is included which contains at least one speed regulator arm, the arm having a primary end and a secondary end. A regulator arm support mechanism is provided for supporting the speed regulator arm relative to the chalk line dispenser wherein the regulator arm support mechanism rotates with the spool. The regulator arm support mechanism pivotally supports the primary end, and further supports a spring for retracting a dispensed length of the string. An arbor is attached to the casing so that relative rotation therebetween is prevented. The primary end of the regulator arm is adjacent to the arbor, wherein, when the spool is rotating at relatively low speeds the primary end of the regulator arm is not in contact with the arbor, and when a predetermined spool speed is exceeded which pivots the arm so that the secondary end of the arm is centrifugally extended, the primary end contacts the arbor, thereby, providing regulation of the speed of the spool. A spool control actuator is provided for 1) controlling the spool in a neutral position for allowing dispensing or retraction of the string and for 2) controlling the spool in a lock position for restricting movement of the string.

10 Claims, 3 Drawing Sheets

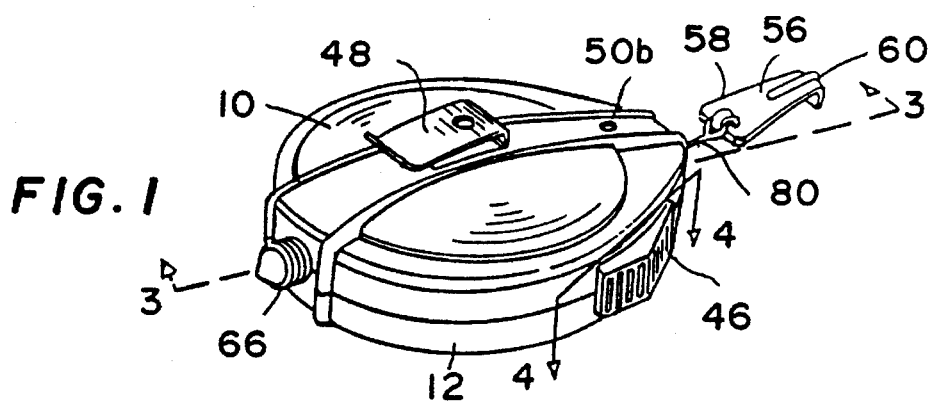
FIG. 1
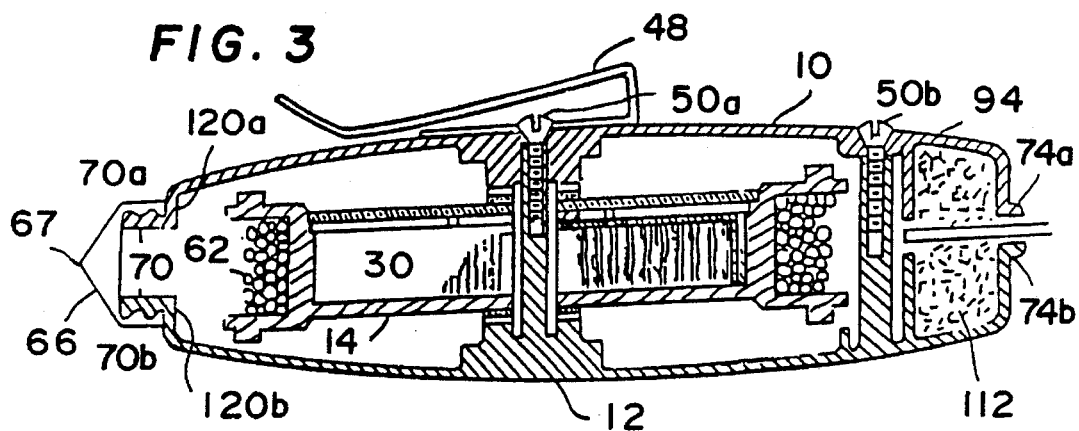
FIG. 3
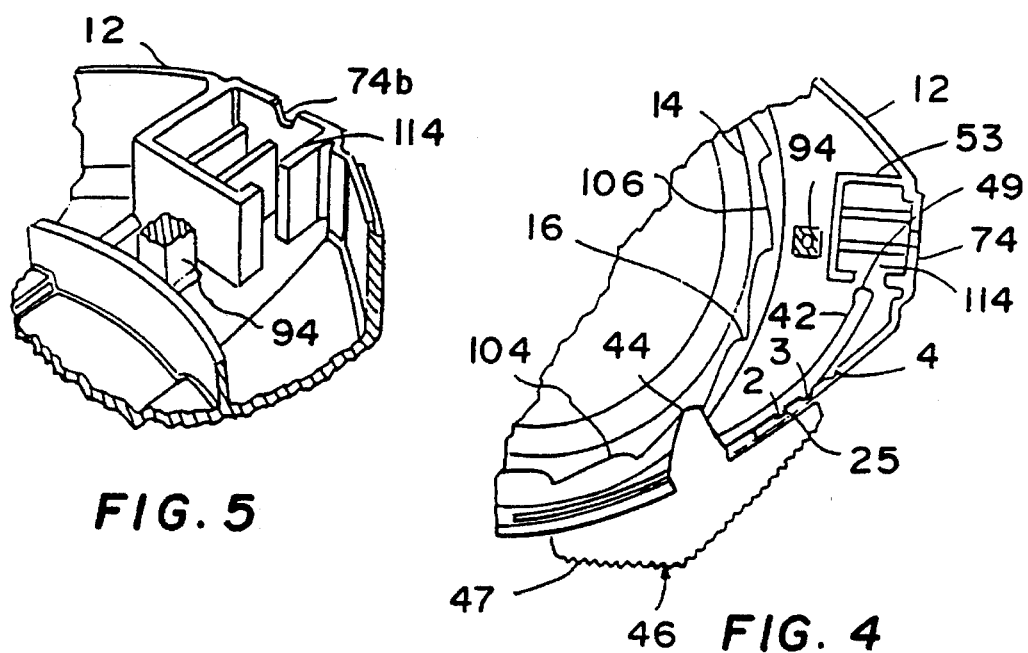
FIG. 5
FIG. 4

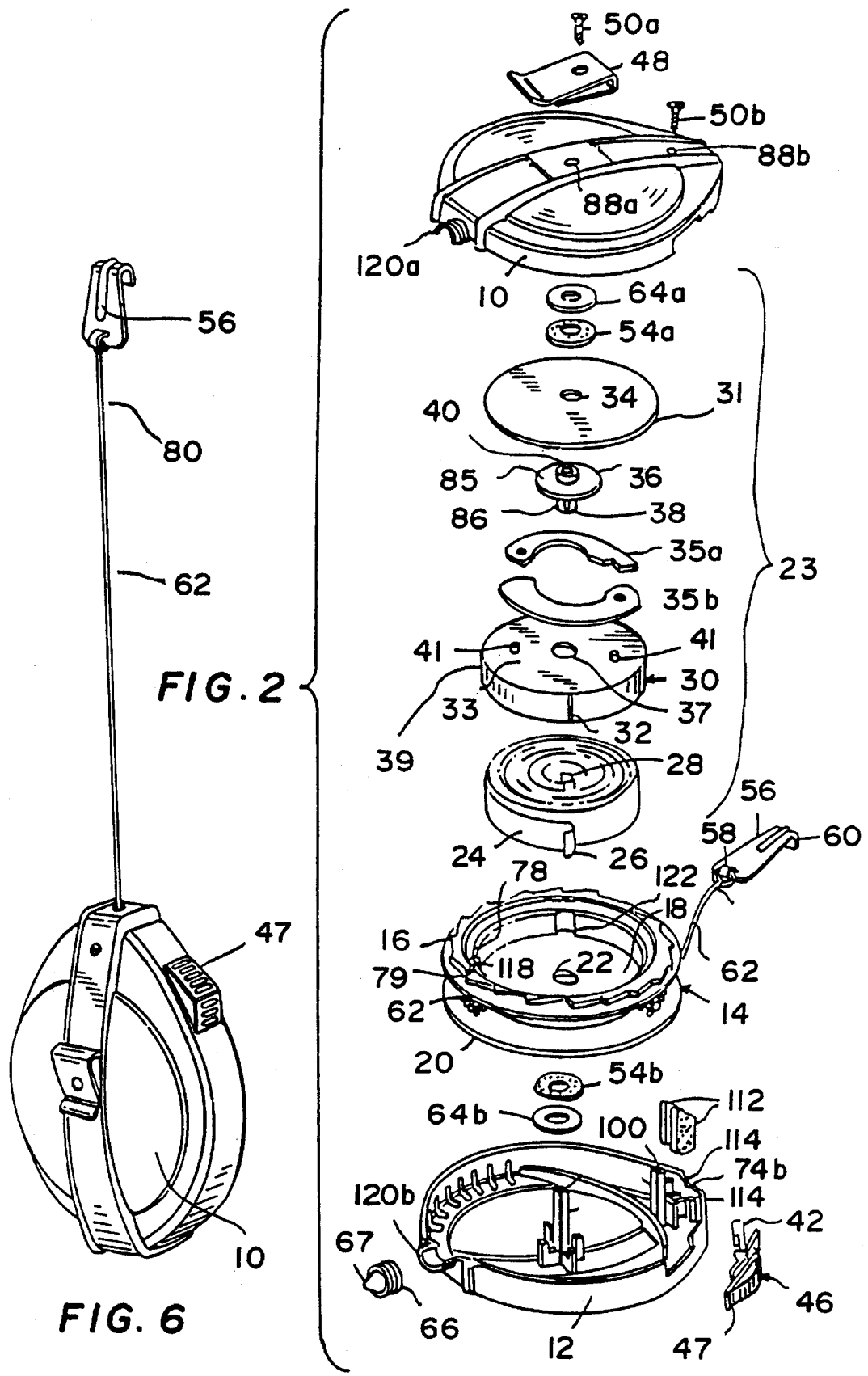

RETRACTABLE CHALK LINE DEVICE

BACKGROUND OF THE INVENTION

1. Field of the Invention

The present invention relates generally to carpentry tools and more particularly to an automatically retracting chalk line dispenser for conveniently dispensing and retracting a chalked string, such as those commonly used by carpenters to form straight lines.

2. Description of the Related Art

Chalk lines used by carpenters in the construction of buildings and the like are well known. Chalk lines are commonly used for marking structures, such as walls, floors, and ceilings, as well as the associated drywall or other paneling used in the construction thereof. The use of a chalk line provides the carpenter with a straight line along which another structure may be aligned or a cut may be made.

Contemporary chalk line dispensers typically comprise a housing in which a quantity of chalk dust may be disposed and inside of which a spool of string is pivotally mounted such that the string may be extended from the housing while carrying thereupon a small amount of chalk dust. The string is extended such that it coincides with a line for which marking is desired. The string is then held stationary at both ends and plucked near the middle such that chalk dust is shaken from the string when the string impacts the surface to be marked, thereby forming a straight line between the two ends of the string. A line catch or hook may be utilized to anchor the string at the distal terminus of the line to be formed while the chalk line device is held stationary at the lines proximal the terminus by the user. The string is typically manually retracted into the device via a rotatable handle and winding mechanism.

The use of such chalk line devices is common both because of the ease with which straight lines are formed therewith and because of the temporary nature of the lines so formed. A straight line may be formed in a matter of seconds by a single user. The chalk so disposed upon the surface to be marked can be easily brushed away after having served its intended purpose if so desired.

Various automatically retracting chalk line dispensers are known. Typical of such devices is that described in U. S. Pat. No. 4,813,145 issued to Josey Jr. et al. The Josey device comprises a housing in which a spool is disposed. A spring is disposed within the spool to provide for retraction of the string after use. A hub formed upon the spool extends through the housing such that rotation of the spool may be controlled. This provides the user with a means of reducing the speed with which the string retracts into the device. A locking device is incorporated into the hub to lock the spool in place after the string has been extended. In the locking mechanism of the Josey device, a leaf spring attached to the hub is tensioned against the housing to provide a frictional engagement thereto. As those skilled in the art will recognize, such a frictional locking mechanism is subject to slippage.

Slippage of the locking mechanism on such contemporary chalk line devices results in a hazardous situation wherein the line and line catch or hook are retracted uncontrollably toward the chalk line device and may thereby whip around and potentially inflict damage and/or injury. Thus, it would be desirable to provide a positive locking means which assures that the string and line catch or hook will not be inadvertently and uncontrollably withdrawn into the chalk line device.

Additionally, the intentional retraction of the string and line catch or hook into contemporary devices may result in an uncontrolled retraction in those instances where the speed of retraction is not dampened. In the JOSEY device such damping may be manually applied by squeezing the hub of the device to effect slowing of retraction. However, other contemporary devices lack this feature and are therefore subject to uncontrollable retraction even during the intentional actuation of the retraction mechanism. Thus, it would be desirable to provide a means for automatically limiting or damping the speed of the spool during the retraction process in order to prevent uncontrollable retraction of the string and line catch or hook in order to prevent potential damage and/or injury.

Furthermore, contemporary chalk line devices are susceptible to failure caused by jamming of the retraction mechanism resulting when an excessive quantity of chalk dust surrounds and adheres to the retraction mechanism. Attempts to seal the retraction mechanism from the chalk containing reservoir have been frustrated by manufacturing requirements dictating simplicity of design and ease of assembly to maintain low cost. For example, in the Josey device it is possible for chalk dust to migrate between the spool and housing and then through the spindle aperture to the inside of the spool where the spring is located. Entry of a sufficient quantity of chalk dust may thus foul operation of the spring and thereby reduce the reliability of the retraction mechanism.

Although acceptable for their intended purpose, contemporary chalk lines such as the Josey device generally lack a positive locking means, require that the user manually effect and/or slow retraction of the string, and are susceptible to jamming of the retraction mechanism by entry of chalk dust into the spool where the spring is disposed. As such, although the prior art has recognized to a limited extent the problem of providing an automatically retracting chalk line dispenser, the proposed solutions have to date been ineffective in providing a satisfactory remedy.

SUMMARY OF THE INVENTION

In one aspect the present invention is an automatically retracting chalk line dispenser including, in part, a casing forming a reservoir for storing a quantity of chalk dust. A spool assembly includes a spool having string disposed within the casing such the string contacts the chalk dust. An automatic, centrifugal speed regulator assembly is included which contains at least one speed regulator arm, the arm having a primary end and a secondary end. Regulator arm support means is provided for supporting the speed regulator arm relative to the chalk line dispenser wherein the regulator arm support means rotates with the spool. The regulator arm support means pivotally supports the primary end, and further supports a spring for retracting a dispensed length of the string. An arbor is attached to the casing so that relative rotation therebetween is prevented. The primary end of the regulator arm is adjacent to the arbor, wherein, when the spool is rotating at relatively low speeds the primary end of the regulator arm is not in contact with the arbor, and when a predetermined spool speed is exceeded which pivots the arm so that the secondary end of the arm is centrifugally extended, the primary end contacts the arbor, thereby providing regulation of the speed of the spool. A spool control actuator is provided for 1) controlling the spool in a neutral position for allowing dispensing or retraction of the string and for 2) controlling the spool in a lock position for restricting movement of the string.

The automatic, centrifugal speed regulator assembly may be used in applications other than chalk line dispensers. For example, it may be used for retracting line devices, such as fishing reels, dog leashes, clothes lines, electrical motors, or other applications that require speed governing or regulation. As the string is stretched to "pluck" the line, the tension of the string imparted on the spool retains the latch in the locked position until manually disengaged.

The spool control actuator preferably comprises a novel thumb slide assembly which may be used, not for chalk dispensers, but with numerous types of retracting devices, such another retracting device of the type having a casing for containing a spool for winding a dispensable material (i.e. in this case—string), the casing further including an enclosure having an opening for passage of the dispensable material outside the casing. The novel thumb slide assembly, comprises:

a) a thumb grip slidably mounted on the casing;

b) a pair of opposed tabs connected to the thumb grip, the tabs for straddling the spool and engaging associated teeth located on opposing faces of the spool; and c) an elongated finger connected to the thumb grip, an end of the finger for abutting a compressible material contained within the enclosure when the thumb grip is slid along the casing to a predetermined position, the finger including at least one projection for engaging one of at least two associated spaced detentes on an inner surface of the casing.

The thumb slide assembly operates so that: 1) when the thumb grip is in a neutral position and the projection engages one of the detentes, the opposed tabs are disengaged from the spool teeth allowing dispensing or retraction of the dispensable material; 2) when the thumb grip is in a locked position and the projection engages a second of the detentes, the opposed tabs are engaged with the spool teeth restricting movement of the dispensable material, and, 3) when the thumb grip is in a manual brake position, the opposed tabs are disengaged from the spool teeth, however, the end of the finger presses the compressible material, thereby providing friction breaking of the dispensable material.

A line catch is attached to the distal end of the string and has a hook formed thereon such that the line catch may be used to secure the distal end of the string in place at the location of the distal terminus of a line to be formed.

An arbor extends axially through the spool and defines that portion of the housing to which the spring is attached. The arbor extends through two pivot apertures, one formed in the spool and one formed in the cover. Both the spool and the cover have a pivot aperture formed centrally therein such that they may pivot about the arbor. The covered recess of the spool containing the spring is sealed at the two pivot apertures by disposing felt washers on the arbor intermediate the sealed recess and the housing. The felt washers thus substantially prevent chalk dust from migrating through the pivot apertures and into the sealed recess.

The felt washers additionally function as dampers to reduce the speed with which the spool rotates as the string is retracted into the housing. The felt washers increase the friction between the spool or cover and the housing. The felt washers thus limit the rate at which the spring may urge the spool into motion. This damping or speed limiting action prevents the string from being retracted at such a speed that the motion of its distal end, i.e. the line catch, cannot be controlled and therefore would represent a substantial hazard. Thus, the felt washers permit the controlled retraction of the string and line catch without the need for manual control or operator intervention as in the Josey device wherein the user was required to slow retraction of the string by applying pressure to the hub with the palm of a hand.

Sealing of the recess of the spool to prevent chalk dust from contacting the spring increases the reliability of the automatically retracting chalk line dispenser by assuring free movement of the spring to effect retraction. Thus, the probability of sticking or binding caused by the chalk dust is reduced.

Disposing the spool within the housing such that the spool is generally centered with respect to the longitudinal axis of the housing provides for symmetrical weight distribution of the automatically retracting chalk line dispenser such that the automatically retracting chalk line dispenser may be used as a plumb bob by extending a desired length of string and suspending the automatically retracting chalk line dispenser therefrom. A pointed chalk fill aperture stopper may serve as an indicator when the device is being used as a plumb bob.

The teeth are preferably comprised of a steep ramp and a gradually sloped ramp formed in an alternating or sawtooth configuration. Rotation of the spool in a direction to cause retraction of the chalk line when the slide is disposed in a locked position will result in abutment of the steep ramp with the detent of the slide mechanism such that the spool is locked into place and cannot rotate further. However, rotation of the spool in the direction to extend the string results in abutment of the gradually sloped ramp with the detent such that the detent rides up the sloped ramp and permits rotation of the spool. Rotation of the spool may cause the gradually sloped ramp to frictionally engage and push the detent toward the unlocked direction to further facilitate dispensing of the chalk line. Thus, the locking mechanism does not function to prevent extraction of the string when the slide is placed in the locked position. This facilitates ready dispensing of additional quantities of string without the necessity of unlocking the device. Indeed, a spring may be utilized to bias the slide and detent formed thereon in the locked position such that a user may dispose the slide in the unlocked position during dispensing of the string, but is not required to do so. That is, string may be dispensed without moving the slide from the locked position. However, it will be appreciated that moving the slide to the unlocked position reduces the tension or braking action of the detent upon the spool, thus facilitating more ready dispensing of the chalk line.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of the automatically retracting chalk line dispenser of the present invention;

FIG. 2 is an exploded perspective view of the automatically retracting chalk line dispenser of FIG. 1;

FIG. 3 is a cross-sectional side view of the automatically retracting chalk line dispenser of FIG. 1;

FIG. 4 is a top view of a portion of the automatically retracting chalk line dispenser of FIG. 1 having the upper housing removed therefrom;

FIG. 5 is a perspective view of a portion of the automatically retracting chalk line dispenser of FIG. 4;

FIG. 6 is a side view of the automatically retracting chalk line dispenser of FIG. 1 showing the string extended vertically as when the automatically retracting chalk line dispenser is being used as a plumb bob;

The same parts throughout the figures of the drawings are designated by the same numeral designations.

DETAILED DESCRIPTION OF THE PREFERRED EMBODIMENT

Figure 9:
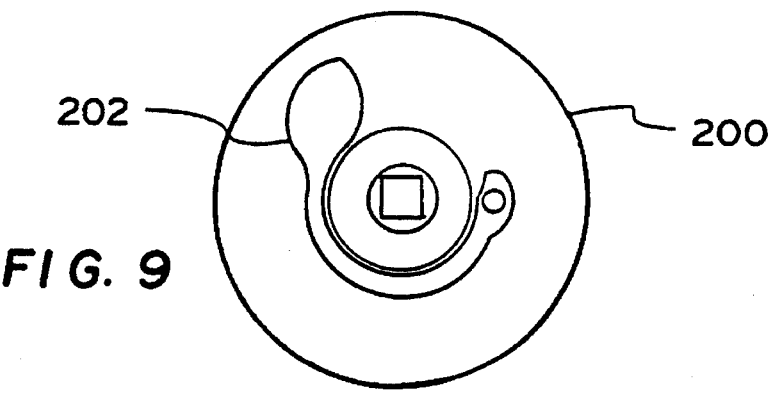
FIG. 9 is a top plan view of an alternate embodiment of a speed regulator assembly with the coverplate removed to expose the single speed regulator arm of this embodiment.

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The automatically retracting chalk line dispenser of the present invention is illustrated in FIGS. 1–6 which depict a presently preferred embodiment of the invention. Referring now to FIGS. 1–5, the automatically retracting chalk line dispenser is comprised (as best seen in FIG. 2) generally of upper 10 and lower 12 housings of a casing, a spool assembly 14 with string 62, a speed regulator assembly 23, and a spool control actuator preferably comprising a thumb slide assembly 46. The upper 10 and lower 12 housings are formed in a clam shell fashion and contain the spool assembly 14, speed regulator assembly 23, and a quantity of chalk dust (not shown). The spool 14 has a plurality of teeth 16 formed upon its periphery, preferably along both the upper and lower surfaces thereof.

The thumb slide assembly 46 is slidably mounted on the casing 10, 12. Assembly 46 includes a thumb grip 47 slidably mounted on the casing 10, 12. Thumb grip 47 has a knurled outer surface. A pair of opposed tabs or "dog ears" 44 (see FIG. 4) straddle the spool and engage associated teeth 16 which are located on the opposing faces of the spool 14. An elongated finger 42 is connected to the thumb grip 47. End 49 of finger 42 abuts felt or other compressible material contained within an enclosure 53 of the casing 10, 12. Finger 42 is extended into the enclosure when the thumb grip 47 is slid along the casing 10, 12 to a predetermined position.

The finger 42 includes a projection 25 for engaging associated spaced detentes 2, 3, 4 on an inner surface of casing 12.

When the grip 47 is in a neutral position, the projection 25 engages detentes 3 and the opposed tabs 44 are disengaged from the spool teeth 16, allowing dispensing or retraction of the string 62. When the thumb grip 47 is in a locked position and the projection 25 engages detent 2, the opposed tabs 44 are engaged with the spool teeth 16 restricting movement of the string 62. When the thumb grip is in a manual brake position and the projection 25 engages detent 4, the opposed tabs 44 are disengaged from the spool teeth 16. However, in this manual brake position, the end 49 of the finger 42 impresses the felt material, thereby providing friction breaking of the string 62. It is noted that the manual brake position correlating to detent 4 is optional.

The speed regulator assembly 23 includes regulator arm support means comprising a spring cup assembly, designated generally as 30 and arm retainment means comprising a coverplate 31. Spring cup assembly 30 comprises a circular baseplate 33 having a centrally disposed opening 37 therethrough. Assembly 30 has a circular rim 39 connected to the baseplate 33 along a circumferential edge thereof. Assembly 30 also includes a slot 32 for retaining a terminal end 26 of spring 24 and two pivot pins 41 extending from the baseplate 33. Speed regulator assembly 23 includes two speed regulator arms 35a, 35b.

Figure 8B:
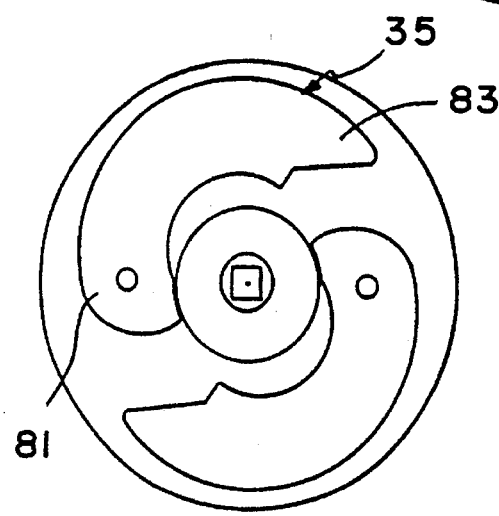
FIGS. 8a and 8b are top plan views of the speed regulator assembly with the coverplate removed to expose the speed regulator arms, FIG. 8a showing the arms retracted at rest and FIG. 8b showing the arms extended while the spool is spinning.
Figure 8A:
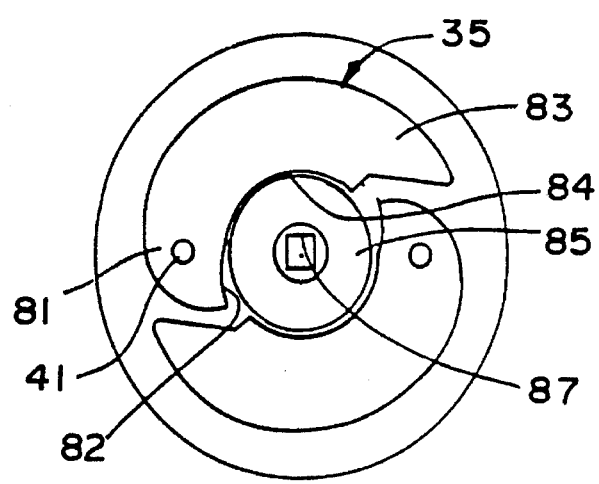
Figure 7:
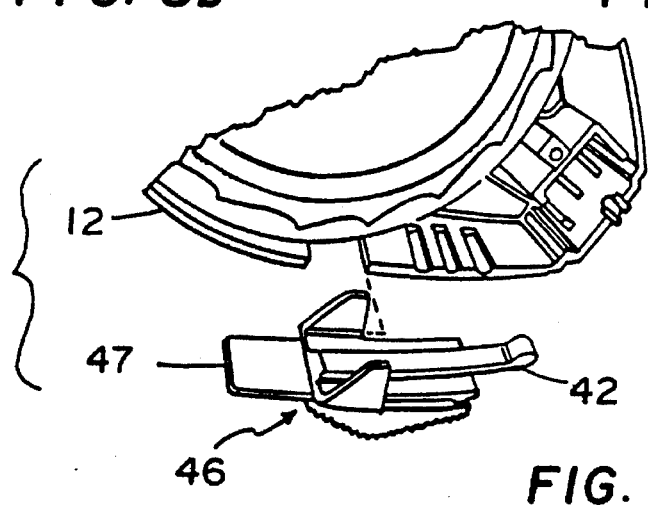
FIG. 7 is a perspective view of the portion of dispenser shown in FIG. 4, shown exploded to reveal details of the thumb slide assembly of the present invention.

Referring now to FIG. 8A, it can be readily seen that each of the speed regulator arms 35a, 35b has a primary end 81 with an opening therethrough for cooperation with an associated pivot pin 41. Each arm 35 has a truncated crescent shape. An inner surface of the primary end 81 has a concave nose radius portion 82 formed thereon. The speed regulator arm 35 has an opposite, secondary end 83. The inner surface 84 of the arm 35 between the nose radius portion 82 and the secondary end 83 is so shaped to have a complimentary fit proximal the peripheral edge of a contact disk portion 85 of an arbor 36 when the speed regulator is stationary.

Referring again now to FIG. 2 it can be seen that arbor 36 includes an axle portion 86 which extends through opening 37 in the circular baseplate 33. The axle portion 86 has an aperture 87 (as seen in FIG. 8A) of a desired geometry (preferably square) for engagement with a central post 92 of the lower housing 12 with a complimentary geometry. These complimentary geometries prevent rotation of the post 92 relative to the axle portion 87.

As mentioned above, the friction contact disk portion 85 of arbor comes in contact with the inner surfaces 84 of the speed regulator arms 35a, 35b during such speed regulation, as will be described in more detail below.

(Although a coverplate 31 is illustrated to show a preferred means for retaining the speed regulation of arms adjacent to the circular baseplate it is within the purview of this invention that other retainment means may alternately be utilized such as pivot pins 41 with flanged or cone shaped heads which could be used to retain the speed regulator arms 35a, 35b.)

The spool 14 and spring cup 33, 39 rotate about arbor 36.

Rotation in a counterclockwise direction, as viewed in FIGS. 1, 2, and 4, results in tensioning of spring 24 as would occur during dispensing of the string 62. Rotation of the spool 14 in a clockwise direction results in lessening of tension upon spring 24 as would occur during retraction of the string 62.

Referring again now to FIG. 8A, when the spool assembly 14 is at rest or rotating at relatively low speeds the primary end of each regulator arm 35 is not a contact with contact disk portion 85. As can be seen in FIG. 8B, when a predetermined spool speed is exceeded, the arms 35 pivot so that the secondary ends 83 are centrifugally extended and the concave nose radius portion 82 contacts disk portion 85 of arbor 86, thereby providing regulation of the speed of the spool assembly 14.

Complimentary cutouts 70a and 70b (referred to collectively as 70) formed in the upper 10 and lower 12 housings, respectively, form a chalk refill aperture 70 through which chalk dust may be introduced into the interior of the assembled housings 10 and 12 and which will be sealed by a pointed screw on cap 66 during use.

Complimentary cutouts 74a and 74b (referred to collectively as 74) in first and second housings 10 and 12, respectively, likewise form a string aperture 74 when the housings 10 and 12 are assembled such that the string 62 may travel therethrough to be extended and retracted during use. The string 62 is disposed about the spool 14 in groove 20 and anchored to the spool 14 by passing the proximal end 78 of the string 62 through an aperture 79 formed in the spool 14 and tying a knot 118 in the proximal end 78 of the string 62 to secure the string 62 to the spool 14.

The spring 24 is disposed within a recess 18 formed within the spool 14. The spring cup assembly or cover 30 seals, preferably via a press fit, the recess 18. The spring 24 is anchored at its distal end in slot 32 of assembly 30 and is anchored at its proximal end 28 in slot 38 formed in arbor 36. Recess 122 formed in spool 18 receives the distal end 26 of spring 24. Arbor 36 is preferably attached to the inside of the lower housing 12 by square post 92. A first fastener or screw 50a is received, via opening 88a of upper housing 10, by the threaded opening 98 of the square post 92 and secures the upper housing 10 thereto. The fastener 50a also attaches belt clip 48 to the upper housing 10. Another fastener 50b is received through opening 88b and is captured in opening 100 of post 94 of lower housing 12.

As can be seen with reference to FIG. 4, the teeth 16 formed upon the spool 14 each comprise a steep ramp surface 104 and a gradually sloped ramp surface 106. The tangential configuration prohibits jamming of the latch with the spool. The dog-ears will engage only at the base of the sawtooth ramp of the spool, preventing the immobility of the spool. The steep surface 104 prevents clockwise rotation such that the spring 24 is prevented from effecting retraction of the string 62 when the thumb slide assembly 46 is disposed in the locked position. Thus, a user may dispense string 62 with the thumb slide 42 in either the manual brake or unlocked position to control unregulated retracting devices to limit the velocity of retraction.

The string exit aperture 74 is sealed to prevent the excess leakage of chalk powder by disposing felt pads 112 on either side of the string 62 and in pad holders 114. The string is thus free to slide intermediate the two felt pads 112. Alternatively, a single felt pad having a slit cut therein may be utilized. The single felt pad would be cut such that it is generally configured the same as if the two separate felt pads had been bonded together along the lower portion of their interface. The slit so formed thus receives the string 62 intermediate the non-bonded upper halves. In this case, the felt pad holder 114 will be sized to accommodate the single slit felt pad.

The pointed tip 67 of the stopper 66 is configured such that it may serve as an indicator when the retractable chalk line device of the present invention is being used as a plumb bob. The stopper 66 may optionally be formed of a resilient material and have at least one cut formed therein such that the elongate nozzle of a chalk dust refill container may be inserted therein to replenish the supply of chalk dust within the reservoir formed by housings 10 and 12.

A threaded fitting 120, comprised of upper 120a and lower 120b portions (referred to collectively as 120), may extend from the chalk dust refill aperture 70 and the cap 66 may be threaded thereupon. One half of the threaded fitting is formed on each of the upper 10 and lower 12 housings such that when the upper 10 and lower 12 housings are mated, the entire fitting 120 is defined.

The distal end 80 of the string 62 attaches to line catch 56 by tying the string 62 through an eyelet 58 thereof. Hook 60 formed in line catch 56 facilitates attachment of the distal end 80 of the string 62 to an architectural structure or the like during use. Felt pads 112 seal the string aperture 74 to prevent the excess leakage of chalk dust from within the reservoir defined by the upper 10 and lower 12 housings. Felt pads 112 permit the string 62 to pass therebetween and through the string aperture 74 while sufficiently sealing the string aperture 74 with respect to the chalk dust.

Upper 54a and lower 54b felt washers seal the cover aperture 34 and spool aperture 22, respectively, to prevent substantial leakage of the chalk dust into the recess 18 of the spool 14 where spring 24 is disposed. Backing washers 64a and 64b maintain the felt seals parallel. Thus, chalk dust is substantially prevented from collecting on and around spring 24 where it might potentially interfere with the proper operation thereof. The square aperture 40 formed within the arbor 36 receives the complimentary square post 92 formed within the lower housing 12. Thus, the arbor 36 does not rotate under the urging of spring 24, thereby allowing tension to develop within spring 24 as the string 62 is dispensed.

The upper 10 and lower 12 housings are formed to have threaded fittings 120a and 120b, respectively, formed thereupon such that the cap 66 may be threadably attached thereto. The cap may comprise a female thread, as illustrated, or a male thread such that it is inserted into the threaded fitting 120. As noted above, point 67 formed upon the distal end of the cap 66 facilitates use of the cap 116 as an indicator when the chalk line is utilized as a plumb bob.

During use the desired quantity of string 62 is extended from the automatically retracting chalk line dispenser of the present invention by grasping the line catch 56 and pulling the string 62 therefrom. The hook 60 of the line catch 56 may be used to secure the distal end 80 of the string 62 at the distal terminus of the line to be formed. Alternatively, the line catch 56 may be held in place by hand. The automatically retracting chalk line dispenser is then positioned such that the proximal end of the dispensed string 62 is positioned at the opposite or proximal terminus of the line and the string is then plucked to provide a chalk line as with contemporary chalk line dispensers. Prior to plucking, the slide assembly 46 is typically disposed in the locked position wherein the tab 44 formed thereon engages the teeth 16 of the spool 14 to lock the spool 14 in position and prevent rotation thereof. Thus, no additional string 62 will be dispensed and the spool 14 will not attempt to rotate under the urging of spring 24 to retract the dispensed string 62 until the slide 46 is moved to the unlocked position.

After plucking the dispensed string 62 to effect marking, the slide 42 may be moved to the unlocked position such that the string 62 retracts into the automatically retracting chalk line dispenser of the present invention. Limiting the rotational speed of the spool 14 prevents the string 62 and line catch 56 from retracting at an uncontrollable speed wherein the string 62 and line catch 56 are subject to whipping about and potentially causing damage and/or injury. The chalk may be replenished by removing the stopper 66 from the chalk refill aperture 70 and adding a desired quantity of chalk to the reservoir.

Referring now to FIG. 6, the automatically retracting chalk line dispenser of the present invention is illustrated in its use as a plumb bob. Being substantially symmetrical in design and weight distribution, the automatically retracting chalk line dispenser may be utilized as a plumb bob by extending a desired quantity of string 62 therefrom and disposing the slide assembly 46 in the locked position. The automatically retracting chalk line dispenser may then be suspended from the dispensed string 62 while holding or anchoring the line catch 56 as desired. The pointed tip 67 of the cap 66 serves to indicate a vertically projected point.

It is understood that the exemplary automatically retracting chalk line dispenser described herein and shown in the drawings represents only a presently preferred embodiment of the invention. Indeed, various modifications and additions may be made to such embodiment without departing from the spirit and scope of the invention. For example, the housing need not be configured and shaped as described and shown in the drawings, but rather may be of any configuration which may be conveniently carried and manipulated and which is suitable for the containment of chalk dust therein. The tensioning mechanism need not be limited to a flat wound spring. It may comprise various types of springs, i.e. round or wire springs.

It is also noted that although the above-described use of two speed regulator arms is preferred, a single speed regulator arm may be used, as illustrated in FIG. 9, the dispenser in such an alternate embodiment designated generally as 200. Such a speed regulator arm being identified by numeral designation 202 in this figure.

These and other modifications and additions may be implemented to adapt the present invention for a variety of different applications.

What is claimed and desired to be secured by Letters Patent of the United States is:

1. An automatically retracting chalk line dispenser comprising:
    a) a casing forming a reservoir for storing a quantity of chalk dust;
    b) a spool assembly comprising a spool having string disposed within said casing such that the string contacts said chalk dust;
    c) an automatic, centrifugal speed regulator assembly comprising:
        1. at least one speed regulator arm, said at least one arm having a primary end and a secondary end;
        2. regulator arm support means for supporting said speed regulator arm relative to said chalk line dispenser wherein said regulator arm support means rotates with said spool, said regulator arm support means for pivotally supporting said primary end, said regulator arm support means further supporting a spring for retracting a dispensed length of the string; and
        3. an arbor having a friction contact disk portion, said arbor being attached to the casing so that relative rotation therebetween is prevented, said primary end of said regulator arm being adjacent to said arbor, wherein, when the spool is rotating at relatively low speeds the primary end of said regulator arm is not in contact with said arbor and when a predetermined spool speed is exceeded which pivots said arm so that said secondary end of arm is centrifugally extended, said primary end contacts said friction contact disk portion, thereby, providing regulation of the speed of said spool; and,
    d) a spool control actuator for 1) controlling said spool in a neutral position for allowing dispensing or retraction of the string and for 2) controlling said spool in a lock position for restricting movement of the string.

2. The chalk line dispenser of claim 1 wherein said regulator arm support means comprises:
    a) a spring cup assembly, comprising:
        1. a circular base plate having a centrally disposed opening there through;
        2. a circular rim connected to said base plate along a circumferential edge thereof;
        3. means for retaining a terminal end of the spring; and
        4. a plurality of pivot pins extending from said baseplate; and
    b) arm retainment means positioned relative to said arbor for maintaining said at least one speed regulator arm adjacent to said circular baseplate and for providing a spaced relationship between said speed regulator arm and said casing.

3. The chalk line dispenser of claim 2 wherein said arbor comprises:
    a) an axle portion which extends through said opening in said circular baseplate, said axle portion having an aperture of a desired geometry for engagement with a central post of said casing with a complimentary geometry, said geometries preventing rotation of said post relative to said axle portion, said axle portion further including means for securing a proximal end of said spring; and
    b) said friction contact disk being portion along said axle portion, said friction contact disk portion having a peripheral edge for contacting said primary end of said speed regulator arm.

4. The chalk line dispenser of claim 3 wherein said at least one speed regulator arm has a truncated crescent shape, said primary end of said arm with an opening therethrough for cooperation with an associated pivot pin of said spring cup assembly, said arm having an inner surface thereof, said inner surface of said primary end having a concave nose radius portion formed thereon, said speed regulator arm having an opposite, secondary end, an inner surface of said arm between said nose radius portion and said secondary end being so shaped to have a complimentary fit proximal to said peripheral edge of said contact disk portion when said speed regulator assembly is stationary;

said nose radius portion being shaped to have a complimentary fit proximal to said peripheral edge of said contact disk portion of said arbor when a predetermined spool speed is exceeded which pivots said arm so that said secondary end is centrifugally extended, thereby providing regulation of the speed of said spool.

5. The chalk line dispenser of claim 1, wherein said casing further comprises an enclosure having an opening for passage of the string outside the casing, and wherein said spool control actuator comprises a thumb slide assembly, comprising:
    a) a thumb grip slidably mounted on said casing;
    b) a pair of opposed tabs connected to said thumb grip, said tabs for straddling the spool and engaging associated teeth located on opposing faces of the spool; and
    c) an elongated finger connected to said thumb grip, an end of said finger for abutting a compressible material contained within the enclosure when said thumb grip is slid along the casing to a predetermined position, said finger including at least one projection for engaging one of at least two associated spaced detentes on an inner surface of the casing, wherein
        1) when said thumb grip is in a neutral position and said projection engages one of said detentes, said opposed tabs are disengaged from said spool teeth allowing dispensing or retraction of said string, 2) when said thumb grip is in a locked position and said projection engages a second of said detentes, said opposed tabs are engaged with said spool teeth restricting movement of said string, and, 3) when said thumb grip is in a manual brake position, said opposed tabs are disengaged from said spool teeth, however, said end of said finger presses the compressible material, thereby providing friction breaking of the string.

6. The chalk line dispenser of claim 5 wherein each of said teeth on said spool comprises a steep ramp and a gradually sloped ramp, a plurality of said teeth forming a sawtooth configuration.

7. An automatic, centrifugal speed regulator assembly for use with a retracting device, the retracting device of the type having a casing for containing a spool assembly having a spring for retracting a dispensable material, said speed regulator assembly, comprising:

a) at least one speed regulator arm, said arm having a primary end and a secondary end;

b) regulator arm support means for supporting said speed regulator arm relative to said retracting device wherein said regulator arm support means rotates with said spool assembly, said regulator arm support means for pivotally supporting said primary end, said regulator arm support means further supporting said spring for retracting a dispensed length of said dispensable material; and c) an arbor having a friction contact disk portion, said arbor being attached to the casing so that relative rotation therebetween is prevented, said primary end of each said regulator arm being adjacent to said arbor, wherein, when said spool assembly is rotating at relatively low speeds the primary end of said regulator arm is not in contact with said arbor and when a predetermined spool speed is exceeded which pivots said arm so that said secondary end of said arm is centrifugally extended, said primary end contacts said friction contact disk portion, thereby, providing regulation of the speed of said spool assembly.

8. An automatic, centrifugal speed regulator assembly for use with a retracting device, the retracting device of the type having a casing for containing a spool assembly having a spring for retracting a dispensable material, said speed regulator assembly, comprising:

a) a spring cup assembly, comprising:
1. a circular baseplate having a centrally disposed opening therethrough;
2. a circular rim connected said baseplate along a circular peripheral edge thereof;
3. means for retaining a terminal end of the spring; and
4. a plurality of pivot pins extending from said baseplate;

b) at least one speed regulator arm, said at least one arm having a primary end with an opening therethrough for cooperation with an associated pivot pin, said arm having an inner surface thereof;

c) an arbor, comprising:
1) an axle portion which extends through said opening in said circular baseplate, said axle portion having an aperture of a desired geometry for engagement with a central post of said casing with a complimentary geometry, said geometries preventing rotation of said post relative to said axle portion, said axle portion further including means for securing a proximal end of said spring; and
2) a friction contact disk portion along said axle portion, said friction contact disk portion having a peripheral edge for contacting said inner surface of said primary ends of said speed regulator arms; and d) arm retainment means positioned relative to said arbor for maintaining said speed regulator arm adjacent to said circular baseplate and for providing a spaced relationship between said speed regulator arm and said casing.

9. The speed regulator assembly of claim 8 wherein each said at least one speed regulator arm has a truncated crescent shape, said primary end of said arm with an opening therethrough for cooperation with an associated pivot pin of said spring cup assembly, said arm having an inner surface thereof, said inner surface of said primary end having a concave nose radius portion formed thereon, said speed regulator arm having an opposite, secondary end, an inner surface of said arm between said nose radius portion and said secondary end being so shaped to have a complimentary fit proximal to said peripheral edge of said contact disk portion when said speed regulator assembly is stationary;

said nose radius portion being shaped to have a complimentary fit proximal to said peripheral edge of said contact disk portion of said arbor when a predetermined spool speed is exceeded which pivots said arm so that said secondary end is centrifugally extended, thereby providing regulation of the speed of said spool.

10. A thumb slide assembly for use with a retracting device, the retracting device of the type having a casing for containing a spool for winding a dispensable material, said casing further including an enclosure having an opening for passage of the dispensable material outside the casing, said thumb slide assembly, comprising:

a) a thumb grip slidably mounted on the casing;

b) a pair of opposed tabs connected to said thumb grip, said tabs for straddling the spool and engaging associated teeth located on opposing faces of the spool; and c) an elongated finger connected to said thumb grip, an end of said finger for abutting a compressible material contained within the enclosure when said thumb grip is slid along the casing to a predetermined position, said finger including at least one projection for engaging one of at least two associated spaced detentes on an inner surface of the casing, wherein 1) when said thumb grip is in a neutral position and said projection engages one of said detentes, said opposed tabs are disengaged from said spool teeth allowing dispensing or retraction of said dispensable material, 2) when said thumb grip is in a locked position and said projection engages a second of said detentes, said opposed tabs are engaged with said spool teeth restricting movement of said dispensable material, and, 3) when said thumb grip is in a manual brake position, said opposed tabs are disengaged from said spool teeth, however, said end of said finger presses the compressible material, thereby providing friction breaking of said dispensable material.

* * * * *